United States Patent
You et al.

(10) Patent No.: US 9,706,124 B2
(45) Date of Patent: Jul. 11, 2017

(54) STABILIZER FOR AN OPTICAL DEVICE AND ELECTRONIC DEVICE COMPRISING THE SAME

(71) Applicant: Nokia Technologies Oy, Espoo (FI)

(72) Inventors: Yiping You, Beijing (CN); Rongli Fan, Beijing (CN); Depeng Shan, Beijing (CN); Lei Yang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/899,780

(22) PCT Filed: Jun. 10, 2014

(86) PCT No.: PCT/FI2014/050468
§ 371 (c)(1),
(2) Date: Dec. 18, 2015

(87) PCT Pub. No.: WO2014/207298
PCT Pub. Date: Dec. 31, 2014

(65) Prior Publication Data
US 2016/0142634 A1    May 19, 2016

(30) Foreign Application Priority Data
Jun. 28, 2013    (CN) .......................... 2013 1 0274427

(51) Int. Cl.
*H04N 5/232*    (2006.01)
*G03B 5/00*    (2006.01)
(Continued)

(52) U.S. Cl.
CPC ....... *H04N 5/23287* (2013.01); *G02B 27/642* (2013.01); *G02B 27/646* (2013.01);
(Continued)

(58) Field of Classification Search
None
See application file for complete search history.

(56) References Cited

U.S. PATENT DOCUMENTS

| 8,089,694 B2 * | 1/2012 | Wernersson ......... G02B 27/646 359/554 |
| 2006/0284495 A1 | 12/2006 | Seo et al. ........................ 310/12 |

(Continued)

FOREIGN PATENT DOCUMENTS

| CN | 1148690 A | 4/1997 |
| CN | 101218653 A | 7/2008 |

(Continued)

*Primary Examiner* — James Hannett
(74) *Attorney, Agent, or Firm* — Harrington & Smith (57) ABSTRACT

There is provided a stabilizer for an optical device that forms part of an electronic device and an electronic device including the stabilizer. The stabilizer includes two first actuators, each of which includes a first coil assembly and a first block of ferromagnetic material, each of the two first coil assemblies being configured to generate, in response to a first electrical signal applied thereto, a first attraction force toward a respective first block of ferromagnetic material, the first blocks of ferromagnetic material being attached to a socket for the optical device; and a rotating device configured to rotate the socket around an optical axis of the optical device in response to the first attraction force. The image stabilization solution according to the present invention is both applicable to AF camera modules and to fix focus camera modules.

13 Claims, 7 Drawing Sheets (51) Int. Cl.
*G02B 27/64* (2006.01)
*G03B 29/00* (2006.01)

(52) U.S. Cl.
CPC ............... *G03B 5/00* (2013.01); *G03B 29/00* (2013.01); *H04N 5/23258* (2013.01); *G03B 2205/0023* (2013.01); *G03B 2205/0069* (2013.01)

(56) References Cited

U.S. PATENT DOCUMENTS

| | | | |
|---|---|---|---|
| 2009/0252488 A1* | 10/2009 | Eromaki | G02B 7/102 396/529 |
| 2010/0202766 A1* | 8/2010 | Takizawa | G03B 5/00 396/55 |
| 2011/0211821 A1 | 9/2011 | Park et al. | 396/55 |
| 2012/0182472 A1 | 7/2012 | Inata et al. | 348/374 |
| 2012/0188441 A1 | 7/2012 | Takizawa | 348/374 |
| 2013/0121672 A1 | 5/2013 | Shikama et al. | 396/55 |
| 2014/0285911 A1* | 9/2014 | Aschwanden | G02B 3/14 359/824 |
| 2014/0355118 A1* | 12/2014 | Park | G02B 27/646 359/557 |
| 2015/0226978 A1* | 8/2015 | Sugawara | G02B 7/08 359/557 |

FOREIGN PATENT DOCUMENTS

| | | |
|---|---|---|
| CN | 101300831 A | 11/2008 |
| CN | 101964871 A | 2/2011 |
| EP | 0741494 A2 | 11/1996 |
| WO | WO-2010043078 A1 | 4/2010 |

* cited by examiner

STABILIZER FOR AN OPTICAL DEVICE AND ELECTRONIC DEVICE COMPRISING THE SAME

TECHNICAL FIELD

Embodiments of the present invention relate to the field of image stabilization, and more particularly, relate to a stabilizer for an optical device that forms part of an electronic device and an electronic device comprising the stabilizer.

BACKGROUND ART

Figure 1:
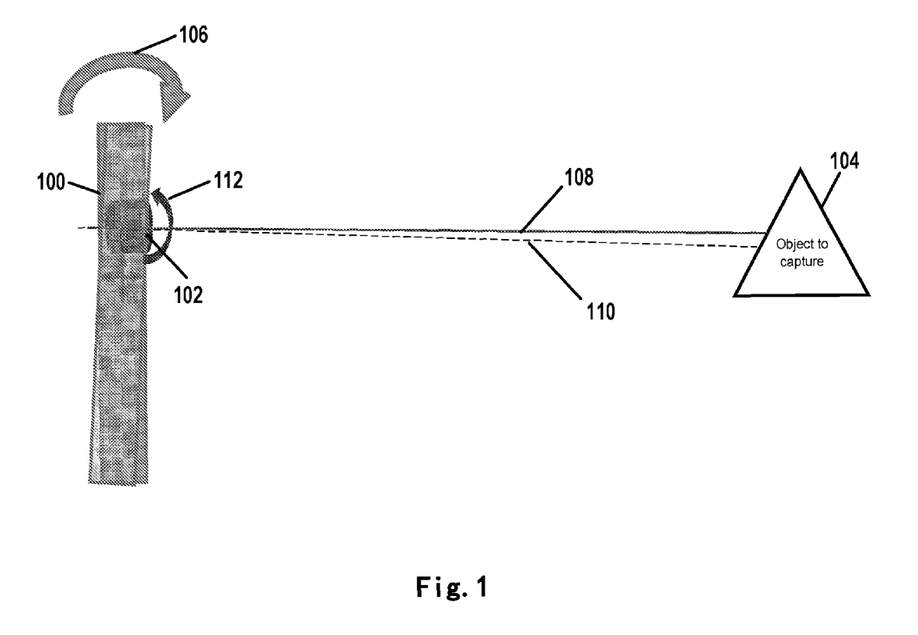

Mobile and/or wireless electronic devices are becoming increasingly popular. For example, mobile phones, portable media players and portable gaming devices are now in wide-spread use. In addition, the features associated with certain types of electronic devices have become increasingly diverse. For example, as shown in FIG. 1, a mobile phone 100 may include a camera module 102 for capturing still images or video.

When a user holds an electronic device such as the mobile phone 100 to take a photograph of an object 104, the mobile phone 100 may be subject to one or more external forces, e.g., a shaking or vibration of a hand holding the mobile phone 100 and is for example rotated clockwise as shown by an arrow 106. The rotation of the mobile phone 100 may lead to a tilt of an optical axis of the camera module 102 from a position 108 to a position 110. In order to keep the image captured by the camera module 102 stable, i.e., to keep the image is the same as the original one without the rotation of the mobile phone 100, the camera module 102 should tilt counterclockwise as shown by an arrow 112 so as to compensate for the movement of the mobile phone 100.

There exists an image stabilization solution to compensate for movements of an electronic device. In the image stabilization solution, a mobile phone comprises an AF camera module and the AF camera module has an optical image stabilization function. This means that a gyroscope sensor, lens moving & control system are all built inside the AF camera module. Lens moves to compensate for the user's hand shaking detected by the gyroscope sensor so as to keep the image stable. However, such an AF camera module integrated with a gyroscope sensor and lens moving & control system are expensive. Moreover, this image stabilization solution is not applicable to a scenario in which a mobile phone is equipped with a cheap, fix focus camera module.

Thus, there is a need to provide an image stabilization solution which is both applicable to AF camera modules and to fix focus camera modules.

SUMMARY OF INVENTION

In view of the foregoing, one or more of the objectives of embodiments of the present invention is to propose a new neighbor discovery solution so as to solve or at least partially mitigate at least part of problems in the prior art.

According to a first aspect of embodiments of the present invention, there is provided a stabilizer for an optical device that forms part of an electronic device. The stabilizer comprises two first actuators, each of which comprises a first coil assembly and a first block of ferromagnetic material, each of the two first coil assemblies being configured to generate, in response to a first electrical signal applied thereto, a first attraction force toward a respective first block of ferromagnetic material, the first blocks of ferromagnetic material being attached to a socket for the optical device. The stabilizer further comprises a rotating device configured to rotate the socket around an optical axis of the optical device in response to the first attraction force.

According to an exemplary embodiment, the rotating device comprises a bearing coaxial with the optical axis, the bearing comprising a fixed outer part and a rotatable inner part, and the inner part being attached to the socket.

According to an exemplary embodiment, the stabilizer further comprises: a pair of second actuators, each of the second actuators comprising a second coil assembly and a second block of ferromagnetic material, the two second blocks being attached to the optical device and arranged to be opposite to each other with respect to the optical axis, each of the two second coil assemblies being secured to the socket and configured to attract, in response to a second electrical signal applied thereto, a respective second block, resulting in a tilt of the optical device towards a respective second coil assembly; and a pair of third actuators, each of the third actuators comprising a third coil assembly and a third block of ferromagnetic material, the two third blocks being attached to the optical device and arranged to be opposite to each other with respect to the optical axis, each of the two third coil assemblies being secured to the socket and configured to attract, in response to a third electrical signal applied thereto, a respective third block, resulting in another tilt of the optical device towards a respective third coil assembly.

According to an exemplary embodiment, the two second blocks and the two third blocks are located at the same distance from a bottom of the optical device, a first line through centers of the two second blocks is perpendicular to a second line through centers of the two third blocks, and the first and second lines intersect at the optical axis.

According to an exemplary embodiment, at least four resilient projections are arranged substantially uniformly on the inner peripheral surface of the socket, and at least four recesses are formed on the outer peripheral surface of the optical device for receiving the four resilient projections respectively.

According to an exemplary embodiment, each of the four resilient projections comprises a curved edge along or adjacent to the outer peripheral surface of the optical device.

According to an exemplary embodiment, a plurality of spring pins are arranged on an inner surface of a bottom of the socket for communicating electrical signals to or from the optical device.

According to an exemplary embodiment, each of the first, second and third blocks of ferromagnetic material comprises one of the following: magnet, ferrite and iron.

According to a second aspect of embodiments of the present invention, there is provided an electronic device. The electronic device comprises: at least one optical device; at least one stabilizer as described above; a gyroscope sensor being external to the optical device, and configured to sense movements of the electronic device and generate a movement signal indicative of the movements; and a controller configured to generate, based on the movement signal, control signals for each of the at least one stabilizer. Each of the at least one stabilizer is configured to tilt or rotate, in response to a respective control signal from the controller, the at least one optical device so as to compensate for the movements.

According to an exemplary embodiment, the controller is further configured to detect changes in inductance of the first, second and third coil assemblies of the each stabilizer so as to adjust an amplitude and/or a duty of the respective control signal.

According to an exemplary embodiment, the at least one optical device comprises a flexible conductor for communicating electrical signals to or from the optical device.

According to an exemplary embodiment, the electronic device comprises two optical devices, and the gyroscope sensor is positioned at a midpoint of the two optical devices.

According to an exemplary embodiment, the at least one optical device comprises a digital still camera and/or a digital video camera.

The image stabilization solution according to the present invention is both applicable to AF camera modules and to fix focus camera modules.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF DRAWINGS

Embodiments of the invention are presented in the sense of examples and their advantages are explained in greater detail below, with reference to the accompanying drawings, wherein FIG. 1 schematically depicts the function of the stabilizer for a camera module that forms part of a mobile phone.

DETAILED DESCRIPTION OF EMBODIMENTS

It should be appreciated that, while this specification contains many specific implementation details, they should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In a first aspect of embodiments of the present invention, there is provided a stabilizer for an optical device that forms part of an electronic device. The electronic device comprises portable radio communication equipments. The portable radio communication equipments include but not limited to mobile phones, pagers, communicators, electronic organizers, PDAs, smartphones or the like. The optical device includes but not limited to digital still cameras, digital video cameras, laser pointers, and so forth. In the case of a digital camera, the optical device may comprise a camera module that includes lenses, an image sensor, and so forth. Hereinafter, the stabilizer will be primarily described in the context of stabilizing a camera module of a digital camera for a mobile phone.

Figure 2:
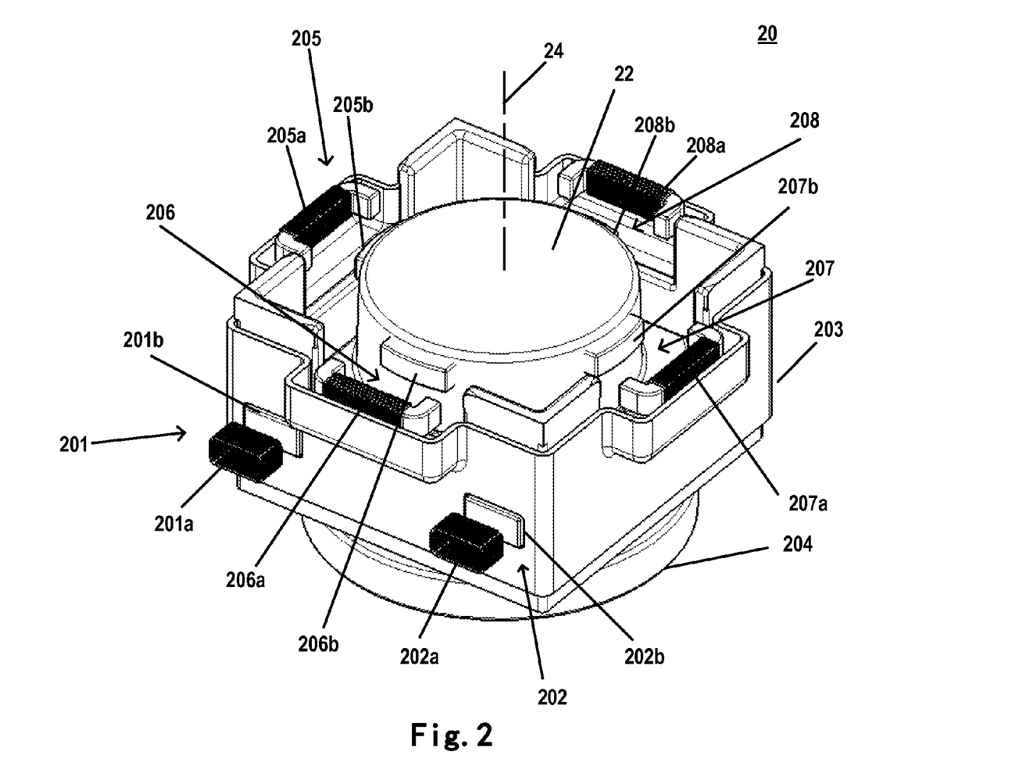
FIG. 2 is a perspective view of a stabilizer according to a first embodiment of the present invention.

FIG. 2 is a perspective view of a stabilizer 20 according to a first embodiment of the present invention. The stabilizer 20 is configured to actuate a camera module 22 that forms part of a mobile phone (not shown) so as to compensate for movements of the mobile phone sensed by a gyroscope sensor (not shown). The stabilizer 20 comprises first actuators 201 and 202. As shown in FIG. 2, the first actuator 201 comprises a first coil assembly 201a and a first block of ferromagnetic material 201b, and the first actuator 202 comprises a first coil assembly 202a and a first block of ferromagnetic material 202b.

Each of the first coil assemblies 201a and 202a may comprise a C-shaped block of ferromagnetic material and a coil wounded thereon. The C-shaped block of ferromagnetic material preferably comprises one or more materials having a low reluctance. The C-shaped block of ferromagnetic material may be secured to a printed wiring board (PWB, not shown) of the mobile phone or to a housing (not shown) of the mobile phone. For the sake of clarity, the first coil assemblies 201a and 202a in FIG. 2 are shown as the coils without being wounded on the C-shaped blocks of ferromagnetic material. The first blocks of ferromagnetic material 201b and 202b are attached to a socket 203 for the optical device 22. For example, the first blocks of ferromagnetic material 201b and 202b may be attached to the socket 203 with adhesive.

Each of the first coil assemblies 201a and 202a is configured to generate, in response to a first electrical signal applied thereon, a first attraction force toward the respective first block of ferromagnetic material 201b or 202b. In other words, in the case where the first electrical signal is applied to the first coil assembly 201a, the first coil assembly 201a will generate, in response to the first electrical signal, the first attraction force toward the respective first block of ferromagnetic material 201b, while in the case where the first electrical signal is applied to the first coil assembly 202a, the first coil assembly 202a will generate, in response to the first electrical signal, the first attraction force toward the respective first block of ferromagnetic material 202b. It will be appreciated that the first blocks of ferromagnetic material 201b and 202b should be positioned on such a location on the socket 203 that a tangential component of the first attraction force is not equal to zero. The first electrical signal is provided by a controller based on a signal output from a gyroscope sensor, as will be described in detail below.

Figure 3:
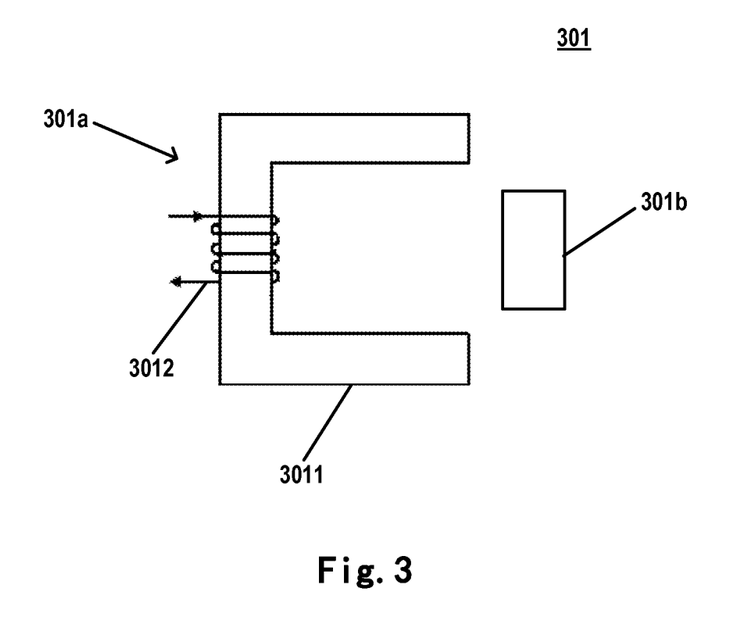
FIG. 3 schematically shows a perspective view of the first actuator according to an example of the first embodiment of the present invention.

FIG. 3 schematically shows a perspective view of the first actuator according to an example of the first embodiment of the present invention. Hereinafter, reference will be made to FIG. 3 to describe a principle about a magnetic reluctance actuation of the first actuator.

As shown in FIG. 3, a first actuator 301 comprises a first coil assembly 301a and a first block of ferromagnetic material 301b. The first coil assembly 301a comprises a C-shaped block of ferromagnetic material 3011 and a coil 3012 wounded thereon. The C-shaped block of ferromagnetic material 3011 preferably comprises material having a low reluctance with a permeability in a range of 4000~5000, such as magnet, ferrite, iron and so on. The coil 3012 preferably comprises a change in inductance in a range of 10 mH~100 mH. The first block of ferromagnetic material 301b also preferably comprises material having a low reluctance, such as magnet, ferrite, iron and so on, and is positioned to face the opening of the "C".

When an alternating current flows through the coil 3012, a magnetic field is induced around the coil. The magnetic flux always forms a closed loop, as described by Maxwell's equations, but the path of the loop depends on the reluctance of the surrounding materials. The magnetic flux is concentrated around the path of least reluctance. Air and vacuum have high reluctance, while easily magnetized materials, such as magnet, ferrite or iron, have low reluctance. The concentration of flux in low-reluctance materials (the C-shaped block of ferromagnetic material 3011) forms strong temporary poles and causes a mechanical force that tends to move the first block of ferromagnetic material 301b towards regions of higher flux. Thus, regarding the direction of the current applied, the resulting mechanical force is always an attraction (pulling) force. When the current flow through the coil 3012, the first block of ferromagnetic material 301b moves from right to left, and magnetic reluctance become lower since some air gap is filled by the first block of ferromagnetic material 301b.

Referring back to FIG. 2, the stabilizer 20 further comprises a rotating device 204. The rotating device 204 is configured to rotate the socket 203 clockwise or counterclockwise around an optical axis 24 of the camera module 22 in response to the first attraction force. In particular, when the first electrical signal is applied to the first coil assembly 201a, the first coil assembly 201a will generate the first attraction force towards the first block of ferromagnetic material 201b, and the rotating device 204 will rotate the socket 203 counterclockwise in response to the first force. When the first electrical signal is applied to the first coil assembly 202a, the first coil assembly 202a will generate the first attraction force towards the first block of ferromagnetic material 202b, and the rotating device 204 will rotate the socket 203 clockwise in response to the first force.

Figure 4:
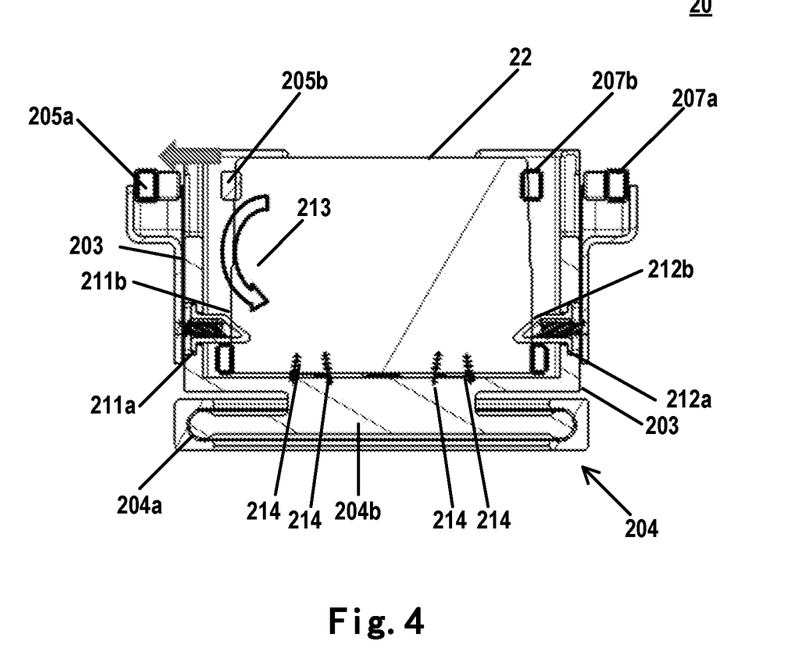
FIG. 4 is a cross-sectional view of the stabilizer of FIG. 2.

In an example, the rotating device 204 comprises a bearing coaxial with the optical axis. In the case of a bearing, the details of the bearing are best shown in FIG. 4. As shown in FIG. 4, a bearing 204 comprises a fixed outer part 204a and a rotatable inner part 204b. The fixed outer part 204a may be secured to the PWB (not shown) of a mobile phone, and the inner part 204b is attached to a socket 203.

Referring further to FIG. 2, the stabilizer 20 further comprises a pair of second actuators 205, 207 and a pair of third actuators 206, 208.

The second actuator 205 comprises a second coil assembly 205a and a second block of ferromagnetic material 205b. The second actuator 207 comprises a second coil assembly 207a and a second block of ferromagnetic material 207b. The two second blocks of ferromagnetic material 205b and 207b are attached to the camera module 22, for example, with adhesive and arranged oppositely with respect to the optical axis 24. Preferably, the two second blocks of ferromagnetic material 205b and 207b are positioned on or in adjacent to an upper edge of the camera module 22. The two second coil assemblies 205a and 207a are secured to the socket 203 and correspond to the second blocks of ferromagnetic material 205b and 207b, respectively. The socket 203 may be formed with recesses for containing the second coil assemblies 205a and 207a. Each of the two second coil assemblies 205a and 207a are configured to attract, in response to a second electrical signal applied thereto, a respective second block of ferromagnetic material 205b or 207b, resulting in a tilt of the camera module 22 towards a second coil assembly 205a or 207a to which the second electrical signal is applied. The second electrical signal is provided by a controller based on a signal output from a gyroscope sensor, as will be described in detail below.

The third actuator 206 comprises a third coil assembly 206a and a third block of ferromagnetic material 206b. The third actuator 208 comprises a third coil assembly 208a and a third block of ferromagnetic material 208b. The two third blocks of ferromagnetic material 206b and 208b are attached to the camera module 22, for example, with adhesive and arranged oppositely with respect to the optical axis 24. Preferably, the two third blocks of ferromagnetic material 206b and 208b are positioned on or in adjacent to an upper edge of the camera module 22. The two third coil assemblies 206a and 208a are secured to the socket 203 and correspond to the third blocks of ferromagnetic material 206b and 208b, respectively. The socket 203 may be formed with recesses for containing the third coil assemblies 206a and 208a. Each of the two third coil assemblies 206a and 208a are configured to attract, in response to a third electrical signal applied thereto, a respective third block of ferromagnetic material 206b or 208b, resulting in a tilt of the camera module 22 towards a third coil assembly 206a or 208a to which the third electrical signal is applied. The third electrical signal is provided by a controller based on a signal output from a gyroscope sensor, as will be described in detail below.

Preferably, the two second blocks of ferromagnetic material 205b, 207b and the two third blocks of ferromagnetic material 206b, 208b are located at the same distance from a bottom of the camera module 22, a first line through centers of the two second blocks of ferromagnetic material 205b, 207b is perpendicular to a second line through centers of the two third blocks of ferromagnetic material 206b, 208b, and the first and second lines intersect at the optical axis.

Like the first coil assemblies 201a and 202a, each of the second and third coil assemblies 205a, 206a, 207a and 208a may comprise a C-shaped block of ferromagnetic material and a coil wounded thereon. The C-shaped block of ferromagnetic material preferably comprises material having a low reluctance, such as magnet, ferrite, iron and so on. Since the principle about a magnetic reluctance actuation of the second and third coil assemblies is the same as that of the first coil assembly as described with reference to FIG. 3, the detailed description thereof is omitted.

Figure 5:
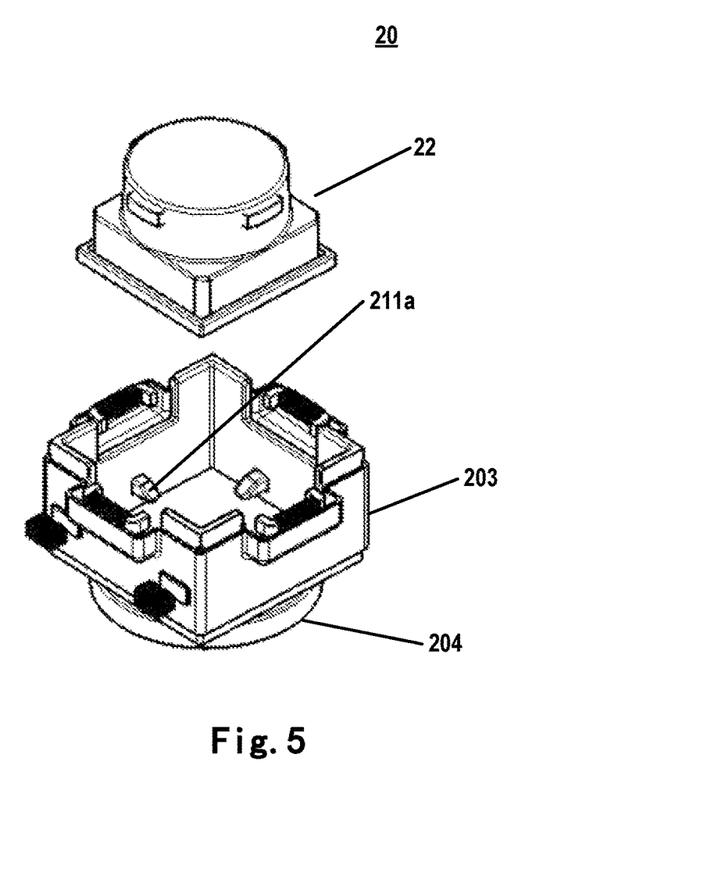
FIG. 5 is an exploded perspective view of the stabilizer of FIG. 2.

Further, in the embodiment of FIG. 2, at least four resilient projections are arranged substantially uniformly on the inner peripheral surface of the socket 203, and at least four recesses are formed on the outer peripheral surface of the camera module 22 for receiving the four resilient projections, respectively. The details of the resilient projections and the respective recesses are best shown in FIGS. 4 and 5. FIG. 4 is a cross-sectional view of the stabilizer of FIG. 2. FIG. 5 is an exploded perspective view of the stabilizer of FIG. 2. Resilient projections 211a and 212a, and the respective recesses 211b and 212b are shown in FIG. 4. In FIG. 4, the resilient projections 211a and 212a are arranged oppositely with respect to the camera module 22 and have the same height to the bottom of the camera module 22. FIG. 5 shows a perspective view of the resilient projection 211a as an example.

The at least four resilient projections and the respective resilient projections may be positioned in adjacent to the bottom of the camera module 22 so that the bottom of the camera module 22 are relatively fixed with respect to the socket 203. Additionally, the at least four resilient projections are preferably configured to be movably fitted into the respective resilient projections so that each of the second blocks of ferromagnetic material 205b, 206b, 207b and 208b can be moved towards the respective coil assembly in response to the second force, resulting in a tilt (for example as indicated by an arrow 213) of the camera module 22 with respect to the socket 203. For the purpose of supporting the camera module 22 while the camera module 22 tilts with respect to the socket 203, each of the four resilient projections comprises a curved edge along or adjacent to the outer peripheral surface of the camera module 22. For the ease of assembling of the camera module 22 into the socket 203, each of the at least four resilient projections may be shaped in a wedge. As an example, each of the at least four resilient projections comprises a pogo pin, as shown in FIGS. 4 and 5.

Referring now to FIG. 4, it is shown that a plurality of spring pins 214 are arranged on an inner surface of a bottom of the socket 203 for communicating electrical signals to or from the camera module 22. Alternatively, the camera module 22 may be provided with a flexible conductor (not shown) for communicating electrical signals to or from the camera module 22.

Figure 6:
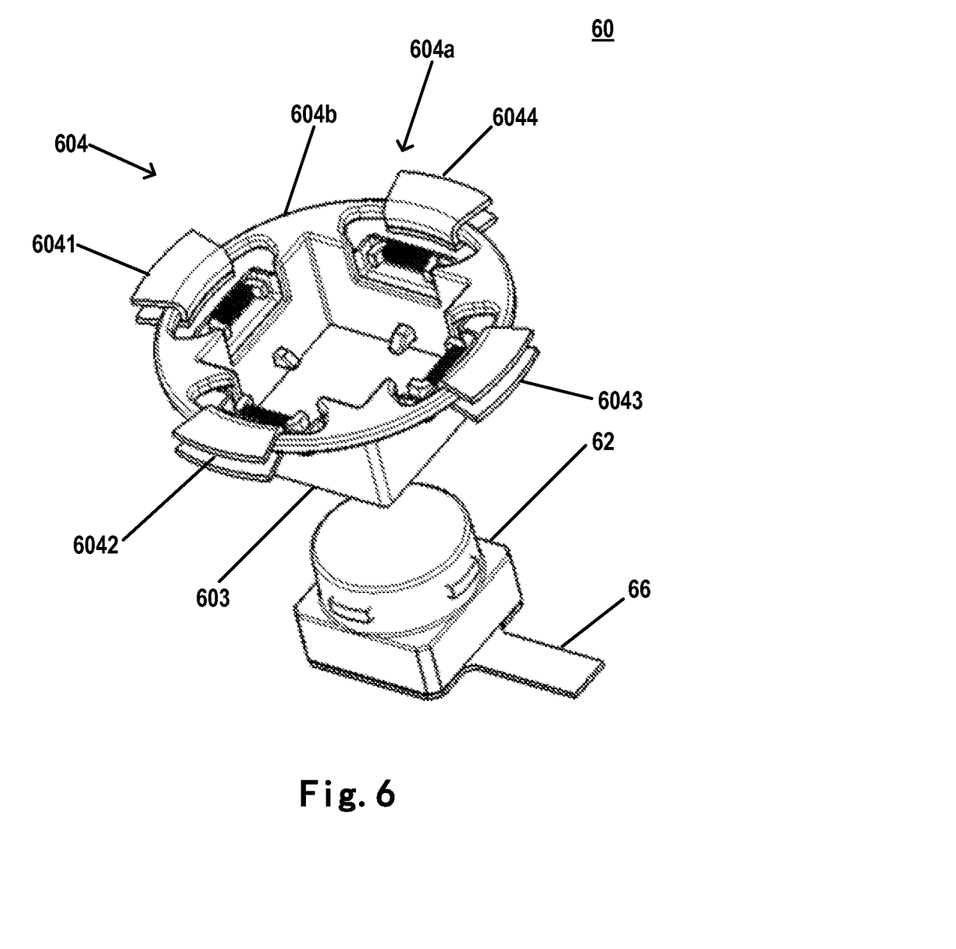
FIG. 6 is a perspective view of a stabilizer according to a second embodiment of the present invention.

FIG. 6 is a perspective view of a stabilizer 60 according to a second embodiment of the present invention. The stabilizer 60 is configured to actuate a camera module 62 that forms part of a mobile phone (not shown) so as to compensate for movements of the mobile phone sensed by a gyroscope sensor (not shown). The stabilizer 60 comprises two first actuators, four second actuators and a rotating device 604. The first actuators and second actuators of the stabilizer 60 may be implemented in the same way as that of the stabilizer 20 of FIG. 2; and thus the detailed description thereof is omitted herein. The stabilizer 60 is primarily different from the stabilizer 20 of FIG. 2 in the rotating device 604. In an example, the rotating device 604 comprises a bearing coaxial with the optical axis of the camera module 62, as shown in FIG. 6. The bearing 604 comprises fixed outer parts 6041, 6042, 6043 and 6044 (collectively referred to as an outer part 604a) and a rotatable inner part 604b. In the embodiment as shown in FIG. 6, the outer part 604a are segmented into the parts 6041, 6042, 6043 and 6044, and the inner part 604b are continuous. In this case, an inner path constituted by the parts 6041, 6042, 6043 and 6044 preferably form a continuous circle so that the rotatable inner part 604b can rotate with respect to the outer part 604a. Alternatively, the outer part 604a is continuous and the inner part 604b is segmented in another embodiment (not shown). The fixed outer part 604a may be a part of the mobile phone and the inner part 604b is attached to a socket 603. In the embodiment of FIG. 6, the socket 603 is provided with an opening at its bottom for the assembling of the camera module 62. As also shown in FIG. 6, the camera module 62 is provided with a flexible conductor 66 for communicating electrical signals to or from the camera module 62.

It will be appreciated that the shapes and positions of the rotating devices 204 and 604 are illustrated in FIG. 2 and FIG. 6 by way of example, and not by way of limitation. Under the teaching of the specification, the skilled in the art could change or modify them as required so that they are applicable to the specific applications.

The stabilizer according to embodiments of the present invention enables the entire optical device (e.g. camera module) to rotate around the optical axis thereof and/or tilt with respect to the socket so as to compensate for the sensed movements of the electronic device (e.g. mobile phone).

In a second aspect of embodiments of the present invention, there is provided an electronic device. The electronic device comprises at least one optical device, at least one stabilizer, a gyroscope sensor and a controller. The gyroscope sensor is disposed to be external to the optical device, senses movements of the electronic device and generates signals indicative of the sensed movements. The controller is configured to generate, based on the signal output from the gyroscope sensor, control signals for each of the at least one stabilizer. Each of the at least one stabilizer is configured to tilt or rotate, in response to a respective control signal from the controller, the at least one optical device so as to compensate for the sensed movements. The electronic device comprises portable radio communication equipments. The portable radio communication equipments include but not limited to mobile phones, pagers, communicators, electronic organizers, PDAs, smartphones or the like. The optical device includes but not limited to digital still cameras, digital video cameras, laser pointers, and so forth. In the case of a digital camera, the optical device comprises a camera module that includes lenses, an image sensor, and so forth. Hereinafter, reference will be made to FIG. 7 to describe an electronic device according to a specific example of the present invention in the context of a mobile phone.

Figure 7:
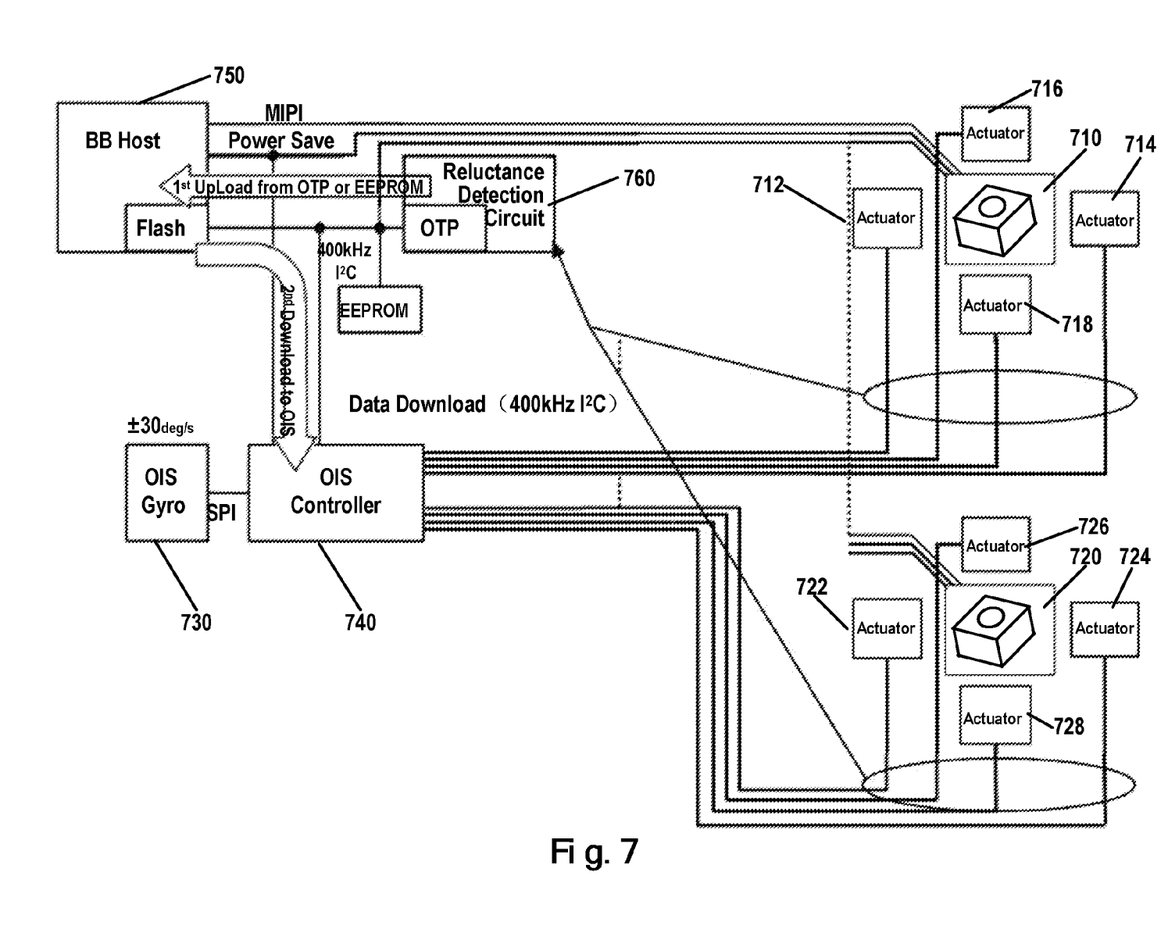
FIG. 7 illustrates a block diagram of the electronic device according to a specific example of the present invention.

FIG. 7 illustrates a block diagram of the electronic device according to a specific example of the present invention. As shown in FIG. 7, a mobile phone 70 comprises a first camera module 710, a first stabilizer for the first camera module 710, a second camera module 720 and a second stabilizer for the second camera module 720, a gyroscope sensor 730 and a controller 740.

The first camera module 710 and the second camera module 720 may be AF or fixed focus camera modules. The first camera module 710 and the second camera module 720 may be adapted to the same or different applications. By way of example, both the first camera module 710 and the second camera module 720 may be digital still camera modules or digital video camera modules, or one of them is a digital still camera module and the other is a digital video camera module. Both of the first camera module 710 and the second camera module 720 may be CMOS camera modules.

The first stabilizers for the first camera module 710 and the second stabilizers for the second camera module 720 may be implemented in the same way as those described with reference to FIGS. 2-6; and thus the detailed description thereof is omitted. For ease of illustration, it is only illustrated in FIG. 7 that the first stabilizer for the first camera module 710 comprises a pair of second actuators 712, 714 and a pair of third actuators 716, 718, with the respective two first actuators (e.g. the first actuators 201, 202) being omitted. Similarly, as for the second camera module 720, it is only illustrated in FIG. 7 that the second stabilizer comprises a pair of second actuators 722, 724 and a pair of third actuators 726, 728, with the respective two first actuators (e.g. the first actuators 201, 202) being omitted.

Hereinafter descriptions will be given in conjunction with the first camera module 710 and the corresponding actuators 712, 714, 716 and 718 as an example.

In FIG. 7, it is assumed that the pair of second actuators 712, 714 is controlled to actuate the camera module 710 so as to compensate for rotations of the mobile phone 70 about an X axis. In particular, the second actuator 712 is responsible to actuate the camera module 710 so as to compensate for rotations of the mobile phone 70 clockwise about an X axis, while the second actuator 714 is responsible to actuate the camera module 710 so as to compensate for rotations of the mobile phone 70 counterclockwise about an X axis. Similarly, it is assumed that the pair of third actuators 716, 718 is controlled to actuate the camera module 710 so as to compensate for rotations of the mobile phone 70 about a Y axis. It will be understood that only one of the second actuators 712, 714 and/or only one of the third actuators 716, 718 will be applied with respective control signals so as to compensate for the rotation of the mobile phone 70 about an X axis and/or the rotation of the mobile phone 70 about a Y axis.

Regarding the gyroscope sensor 730, it will be understood that the gyroscope sensor 730 should be selected for optical image stabilization applications. For example, the gyroscope sensor 730 comprises a full scale range of ±30 deg/s. The gyroscope sensor 730 may comprise a 3-axis gyroscope sensor. Alternatively, the gyroscope sensor 730 may comprise two 2-axis gyroscope sensors, one of which is an X/Y axes gyroscope sensor, the other is an X/Z axes gyroscope sensor. The gyroscope sensor 730 is disposed to be external to both of the first camera module 710 and the second camera module 720. For example, the gyroscope sensor 730 may be secured to a PWB of the mobile phone 70.

The gyroscope sensor 730 is configured to sense movements of the mobile phone 70, e.g., a shaking or vibration of a hand holding the mobile phone 70, generate signals indicative of the sensed movements and output the signals to the controller 740. For example, the gyroscope sensor 730 senses the mobile phone 70 rotates by 1° clockwise about an X axis due to the shaking of the mobile phone 70, an analog-to-digital converter (not shown) in the gyroscope sensor 730 will output for example "X+64" (this digital range is configurable) to the controller 740 via a SPI interface, indicating a block of ferromagnetic material (not shown) in the actuator 712 should move towards a respective coil assembly (not shown) by a distance of "X+64", so that the image captured by the camera module 710 is the same as the original one (without the rotation of the mobile phone 70).

Based on the signals output from the gyroscope sensor 730, the controller 740 will generate a control signal for the actuator 712. The control signal may be for example a PWM signal. The coil assembly in the actuator 712 will attract, in response to the control signal from the controller 740, the block of ferromagnetic material in the actuator 712, resulting in a tilt of the camera module 710.

Generally, the distance by which a block of ferromagnetic material in an actuator moves towards a respective coil assembly is minor, and thus it is difficult to detect it. Thus, it is difficult for the controller 740 to determine whether the distance by which the block of ferromagnetic material actually moves reach the distance indicated by the gyroscope sensor 730 (e.g. "X+64"). As is known in the art, as a block of ferromagnetic material in an actuator moves towards a respective coil assembly, the inductance of the coil in the coil assembly will change. Therefore, after the mobile phone 70 is manufactured, a calibration process may be performed. During the calibration process, there is determined the correlation between the distance by which the block of ferromagnetic material moves towards the respective coil assembly and the corresponding amount of a change in the inductance of the coil in the coil assembly, and a look-up table may be established representing the correlation therebetween. For example, after the block of ferromagnetic material moves towards the coil assembly by a certain distance so that the image captured by the camera module 710 is the same as the original one (without the rotation of the mobile phone 70), it can be detected the amount of the change in the inductance of the coil is "30 mH". Thus, a pair of data items "30 mH & "X+64" may be stored in the look-up table.

The look-up table may be stored in a non-volatile memory of the mobile phone 70, such as OTP (One Time Programmable) register in a flash chip or EEPROM. When a baseband processor 750 detects the camera module 710 is in operation, the look-up table will be uploaded from the OTP register or EEPROM to the baseband processor 750, and then downloaded together with initial parameters for OIS from the baseband processor 750 to the controller 740.

Thus, when the controller 740 obtains a distance, e.g. "X+64", from the gyroscope sensor 730, the controller 740 can search the look-up table to find the corresponding desired amount of a change in the inductance of the coil in the coil assembly, thereby determining whether the distance by which the block of ferromagnetic material actually moves reach the distance indicated by the gyroscope sensor 730 (e.g. "X+64") by detecting the amount of the change in the inductance of the coil.

In order to detect the amount of the change in the inductance of the coil, there is provided an inductance detection circuit 760. In an implement, the inductance detection circuit 760 and the controller 740 may be integrated into a single IC chip.

It will be appreciated the look-up table varies from one camera module to another because of their different mechanical features. In particular, as for the output "X+64" of the gyroscope sensor 730, the amount of the change in the inductance of the coil in the camera module 710 needs to be "30 mH", the amount of the change in the inductance of the coil in the camera module 720 may need to be "29 mH", resulting different look-up tables for the camera module 710 and for the camera module 720. Thus, after the mobile phone 70 is manufactured, two calibration processes needs to be performed so as to obtain two look-up tables for the camera module 710 and for the camera module 720, respectively. In operation, based on the detection of active modes of the two camera modules, the look-up table(s) for the camera module(s) in the active mode may be uploaded from the OTP register or EEPROM to the baseband processor 750. Then, the look-up table(s) for the camera module(s) in the active mode together with the ID(s) of the camera module(s) will be downloaded from the baseband processor 750 to the controller 740.

The electronic device according to embodiments of the present invention may comprise one or more (e.g. two or three) optical device, and corresponding stabilizers for each of the optical devices. For example, in the case of two optical devices, the controller can be configured to generate, based on the signal output from the gyroscope sensor, control signals for each of the two stabilizers. The two stabilizers may actuate, in response to a respective control signal from the controller, a respective optical device so that the two optical devices tilt towards the respective socket, for example, in opposite direction (where the two optical devices are positioned at either end of the electrical device, and the gyroscope sensor is positioned at a midpoint of a line connecting centers of the two optical devices).

It should be understood that the above specification and the figures relating to it are only intended to illustrate the present invention. Thus, the invention is not limited only to the embodiments presented above or to those defined in the claims, but many various such variations and modifications of the invention will be obvious to the professional in the art, which are possible within the scope of the inventive idea defined in the appended claims.

What is claimed is:

1. A stabilizer for an optical device that forms part of an electronic device, comprising:
    two first actuators, each of which comprises a first coil assembly and a first block of ferromagnetic material, each of the two first coil assemblies being configured to generate, in response to a first electrical signal applied thereto, a first attraction force toward a respective first block of ferromagnetic material, the first blocks of ferromagnetic material being attached to a same side of a socket for the optical device;
    a pair of second actuators, each of the second actuators comprising a second coil assembly and a second block of ferromagnetic material, the two second blocks being attached to the optical device and arranged to be opposite to each other with respect to the optical axis;
    a pair of third actuators, each of the third actuators comprising a third coil assembly and a third block of ferromagnetic material, the two third blocks being attached to the optical device and arranged to be opposite to each other with respect to the optical axis; and
    a rotating device configured to rotate the socket around an optical axis of the optical device in response to the first attraction force.

2. The stabilizer according to claim 1, wherein the rotating device comprises a bearing coaxial with the optical axis, the bearing comprising a fixed outer part and a rotatable inner part, and the inner part being attached to the socket.

3. The stabilizer according to claim 1, wherein each of the two second coil assemblies being secured to the socket and configured to attract, in response to a second electrical signal applied thereto, a respective second block, resulting in a tilt of the optical device towards a respective second coil assembly; and
    wherein each of the two third coil assemblies being secured to the socket and configured to attract, in response to a third electrical signal applied thereto, a respective third block, resulting in another tilt of the optical device towards a respective third coil assembly.

4. The stabilizer according to claim 1, wherein the two second blocks of ferromagnetic material and the two third blocks of ferromagnetic material are located at the same distance from a bottom of the optical device, wherein a first line through centers of the two second blocks is perpendicular to a second line through centers of the two third blocks, and wherein the first and second lines intersect at the optical axis.

5. The stabilizer according to claim 1, wherein at least four resilient projections are arranged substantially uniformly on the inner peripheral surface of the socket, and at least four recesses are formed on the outer peripheral surface of the optical device for receiving the four resilient projections respectively.

6. The stabilizer according to claim 1, wherein each of the four resilient projections comprises a curved edge along or adjacent to the outer peripheral surface of the optical device.

7. The stabilizer according to claim 1, wherein a plurality of spring pins are arranged on an inner surface of a bottom of the socket for communicating electrical signals to or from the optical device.

8. The stabilizer according to claim 1, wherein each of the first, second and third blocks of ferromagnetic material comprises one of the following: magnet, ferrite and iron.

9. An electronic device, comprising:
    at least one optical device;
    at least one stabilizer according to claim 1;
    a gyroscope sensor being external to the optical device, and configured to sense movements of the electronic device and generate a movement signal indicative of the movements; and
    a controller configured to generate, based on the movement signal, control signals for each of the at least one stabilizer;
    wherein each of the at least one stabilizer is configured to tilt or rotate, in response to a respective control signal from the controller, the at least one optical device so as to compensate for the movements.

10. The electronic device according to claim 9, wherein the controller is further configured to detect changes in inductance of the first, second and third coil assemblies of the each stabilizer so as to adjust an amplitude and/or a duty of the respective control signal.

11. The electronic device according to claim 9, wherein the at least one optical device comprises a flexible conductor for communicating electrical signals to or from the optical device.

12. The electronic device according to claim 9, wherein the electronic device comprises two optical devices, and the gyroscope sensor is positioned at a midpoint between the two optical devices.

13. The electronic device according to claim 9, wherein at least one of the two optical device comprises a digital still camera or a digital video camera.

* * * * *